G. HEEDWELL & W. F. McNEW.
OBSTETRICAL AND HOLDING TOOL.
APPLICATION FILED NOV. 8, 1911. RENEWED MAY 15, 1914.
1,123,286.
Patented Jan. 5, 1915.
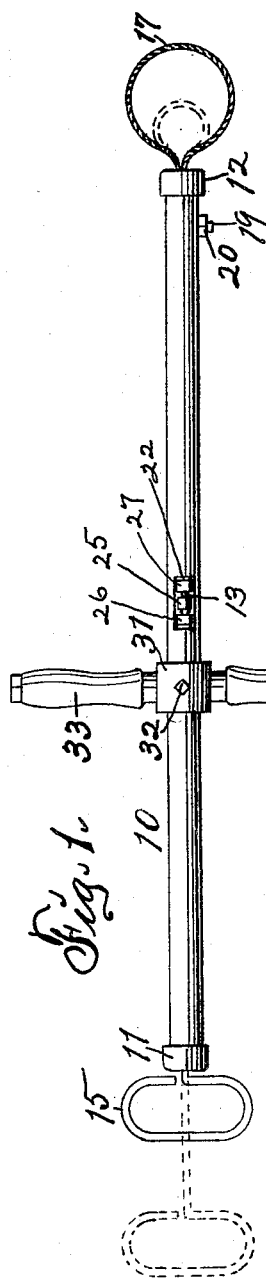
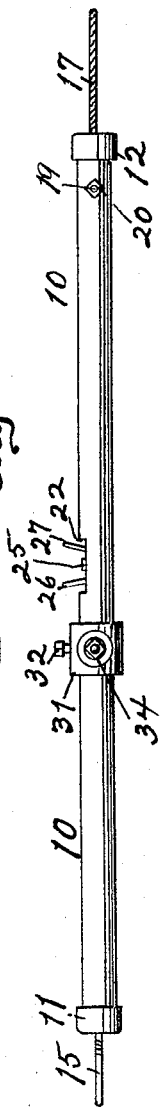
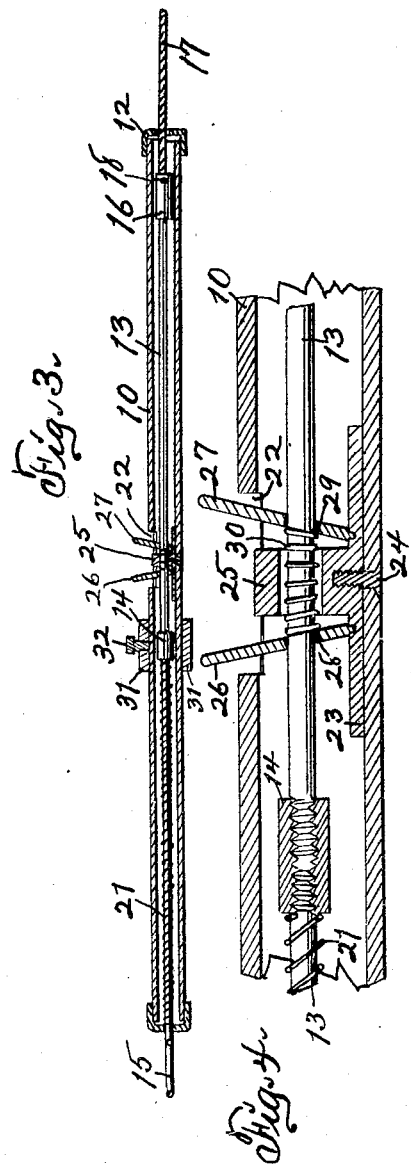

UNITED STATES PATENT OFFICE.

GOTHARD HEEDWELL AND WILLIAM F. McNEW, OF BOONE, IOWA.

OBSTETRICAL AND HOLDING TOOL.

1,123,286.  Specification of Letters Patent.  Patented Jan. 5, 1915.

Application filed November 8, 1911, Serial No. 659,567. Renewed May 15, 1914. Serial No. 838,890.

*To all whom it may concern:*

Be it known that we, GOTHARD HEEDWELL and WILLIAM F. McNEW, citizens of the United States of America, and residents of Boone, Boone county, Iowa, have invented a new and useful Obstetrical and Holding Tool, of which the following is a specification.

The object of this invention is to provide an improved construction for tools adapted for obstetrical purposes and designed to assist in parturition of viviparous animals.

A further object of this invention is to provide an improved tool adapted for use in obstetrical services and also for holding small animals, such as swine, calves and sheep while performing an operation such as ringing the nose.

Our invention consists in the construction, arrangement and combination of elements hereinafter set forth, pointed out in our claims and illustrated by the accompanying drawing, in which—

Figure 1 is an elevation of the complete tool, dotted lines indicating some of the parts in altered positions. Fig. 2 is an elevation at right angles to Fig. 1. Fig. 3 is a longitudinal section of the tool centrally of Fig. 1. Fig. 4 is a detail longitudinal section of an intermediate portion of the device, on an enlarged scale.

In the construction of the device as shown the numeral 10 designates a body or casing which is of tubular form and may be made of a section of pipe. Caps 11, 12 are screwed on the respective ends of the tubular casing 10 and are formed with openings at their central portions. A rod or plunger 13 is mounted for rectilinear reciprocation within the tubular casing 10 and extends at one end through the opening of the cap 11. The rod 13 is preferably formed in two sections of approximately equal length, the inner ends of said sections being screwed into a connecting collar 14. A looped handle 15 is formed on the projecting end of the rod 13 outside the casing 10 and the opposite end of said rod is provided with a socket 16 within said casing. A loop 17, preferably of rope or wire cable, is fixed at one end within the socket 16, as by a pin 18, and the opposite end of said loop is attached to the inner wall of the casing 10 as by a bolt 19 extending through said wall and provided with a nut 20 on its outer end. The bight of the loop 17 extends through the opening in the cap 12 and outside the tubular casing 10. Thus rectilinear reciprocation of the rod or plunger 13 is adapted to expand and contract the loop 17 by varying the size of the bight thereof outside the casing 10. An expansive coil spring 21 is coiled around the rod or plunger 13 and impinges the connecting collar 14 at one end and the inner face of the cap 11 at the opposite end. Thus the loop 17 is normally held in maximum expanded condition by the spring 21 holding the rod 13 to innermost position relative to the casing 10. A rectangular opening 22 is formed in one side of the tubular casing 10 intermediate of its ends. A fulcrum plate 23 is fixed to the inner wall of the casing 10 opposite the opening 22 and held in place by a screw or screws 24. The fulcrum plate 23 is formed with an integral collar 25 loosely embracing the rod or plunger 13. Counterpart clamping blades 26, 27 are fulcrumed at their inner ends in notches in the fulcrum plate 23 on opposite sides of the collar 25. The clamping blades 26, 27 are formed with relatively small holes 28, 29 receiving and embracing the rod 13, and the outer ends of said blades extend through the opening 22 of the casing. An expansive spring 30 is coiled around the rod 13 and impinges at its ends against the inner faces of the blades 26, 27 and normally holds said blades in inclined and diverging positions as shown. When in this position the blades 26, 27 clamp the rod 13 by engagement of the edges of the holes 28, 29 therewith and prevent reciprocation of said rod. Manual force may be applied to the outer ends of the clamping blades 26, 27 to bring them into approximately parallel relations, when the rod 13 will be released and be free to move through the holes 28, 29 of said blades. A collar 31 is mounted on and adjustable longitudinally of the tubular casing 10 and the position of said collar may be set and determined by a set screw 32. Handles 33, 34 are formed on or fixed to and extend diametrically from opposite sides of the collar 32 and said handles are adapted for manual grasp in holding the tool and an animal engaged thereby.

In the practical use of this device as a holding tool the casing 10 is supported in one hand, preferably near the clamping blades 26, 27, while the other hand grasps the handle 15 or the casing near by. The tool is manipulated so as to bring the loop 17 over the snout or leg of an animal to be held, such as a hog or calf, whereupon the blades 26, 27 are pressed together by the thumb and index finger of one hand and draft is applied on the handle 15 with the other hand to reciprocate the rod 13 toward the operator and contract the loop 17. When the loop 17 is sufficiently contracted to hold the animal firmly the blades 26, 27 are released and the spring 30 operates to effectively clamp and hold the rod 13 against reciprocation, thus holding the loop 17 in contracted position. Then the hands may be transferred to the handles 33, 34 for greater convenience in holding the animal while being examined or operated upon. When it is desired to release the animal the blades 26, 27 are again pressed together and the spring 21 operates to reciprocate the rod 13 away from the operator and expand the loop 17.

The device may be used as an obstetrical tool in the same manner as above described, the loop 17 being employed to engage a suitable portion of the foetus and assist in parturition.

We claim as our invention—

1. An obstetrical and holding tool, comprising a tubular casing, a plunger therein, a handle adapted to move said plunger in one direction, a spring acting to move said plunger in the opposite direction, a loop fixed at one end to said casing and at the other end to the end of said plunger opposite to the handle, and handles on and adjustable longitudinally of said casing.

2. An obstetrical and holding tool, comprising a casing, a plunger therein, a handle on one end of said plunger, a loop fixed at one end to the opposite end of said plunger and at the other end to said casing, a spring acting to move said plunger in one direction, and clamping devices acting on said plunger.

3. An obstetrical and holding tool, comprising a casing, a plunger therein, a handle on one end of said plunger, a loop fixed at one end to the opposite end of said plunger and at the other end to said casing, a spring acting to move said plunger in one direction, and clamping devices acting on said plunger, said clamping devices comprising blades pivoted in said casing and embracing said plunger and a spring acting on said blades to set them in oblique positions and clamp the plunger.

Signed by us at Boone, Iowa, this first day of March, 1911.

GOTHARD HEEDWELL.
WILLIAM F. McNEW.

Witnesses:
W. H. CROOKS,
KATHRYN STURMAN.

Copies of this patent may be obtained for five cents each, by addressing the "Commissioner of Patents, Washington, D. C."